Oct. 12, 1954

W. WATERVAL 2,691,356

MULTIPLE PROPELLER DRIVE FOR SHIPS

Filed Nov. 28, 1950

INVENTOR.
WILLIAM WATERVAL
BY

ATTORNEY

Oct. 12, 1954
W. WATERVAL
2,691,356
MULTIPLE PROPELLER DRIVE FOR SHIPS
Filed Nov. 28, 1950
3 Sheets-Sheet 2
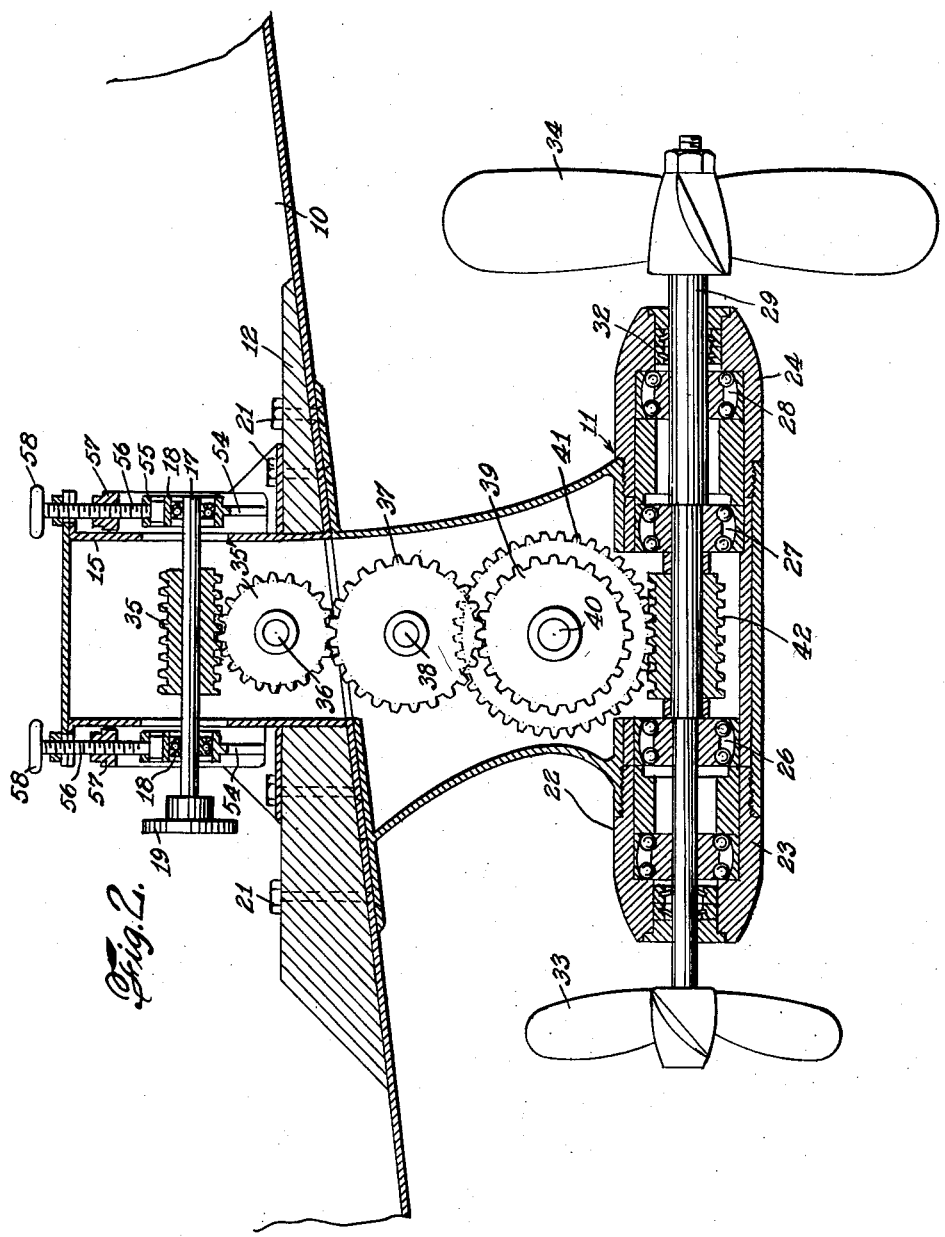
INVENTOR.
WILLIAM WATERVAL
BY
ATTORNEY

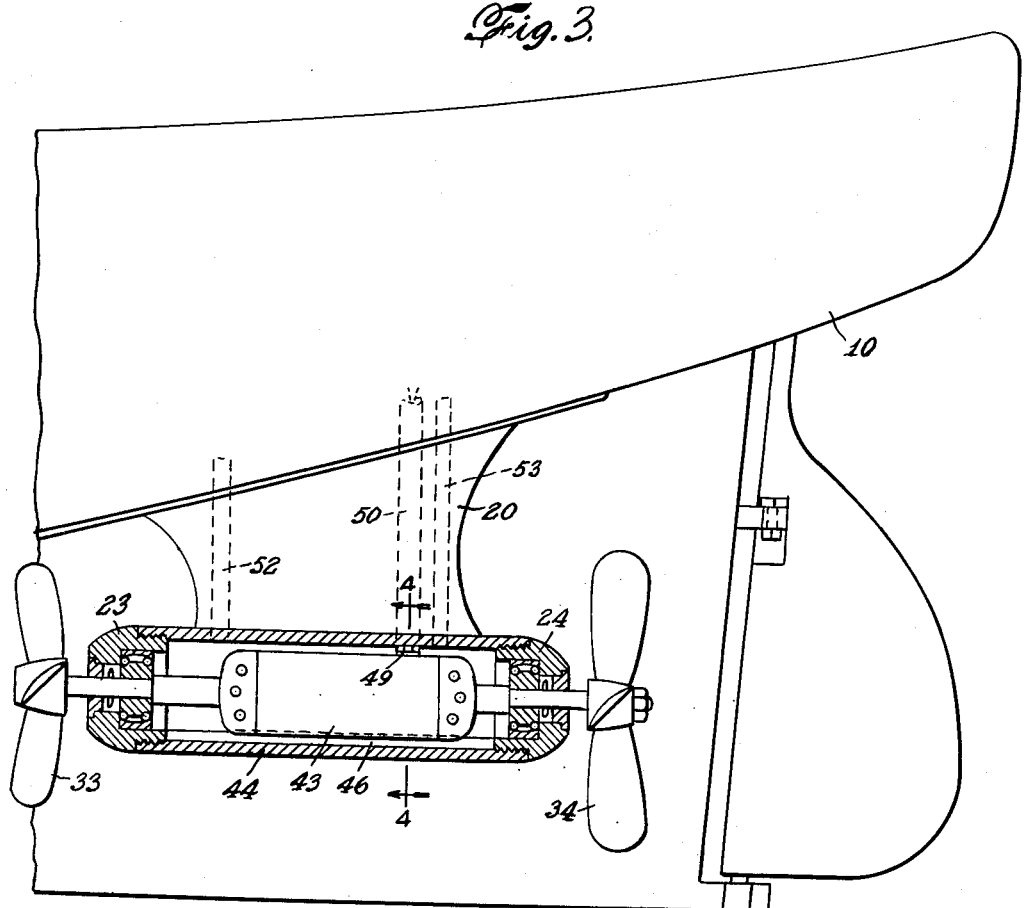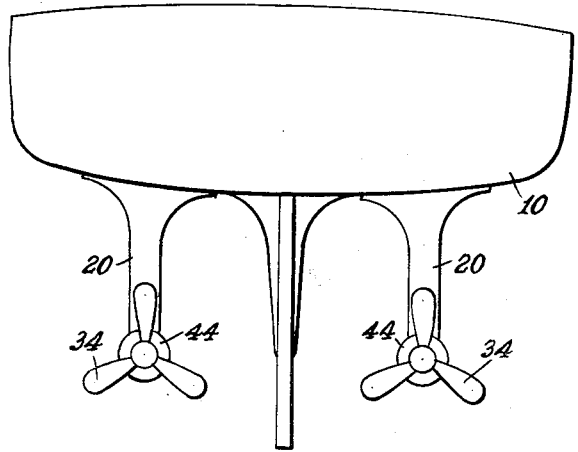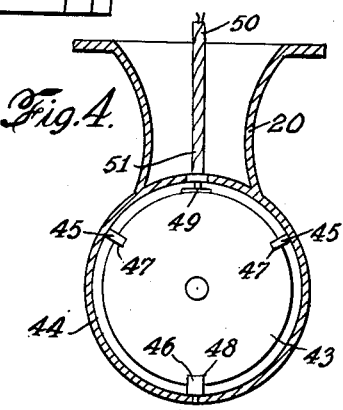

Patented Oct. 12, 1954

2,691,356

UNITED STATES PATENT OFFICE 2,691,356

MULTIPLE PROPELLER DRIVE FOR SHIPS

William Waterval, Brooklyn, N. Y.

Application November 28, 1950, Serial No. 197,959

1 Claim. (Cl. 115—37)

This invention relates to a power drive for ships, and the like, and it has for its object to increase the propulsion of water crafts by means of multiple power units.

More especially this invention relates to a power transmitting mechanism suitable for use in propelling boats.

Another object of the invention is to provide power units readily replaceable, of individual capacity, which, when employed in multiple produce a high efficiency.

With the above and other objects in view, this invention consists of the novel features of construction, combination and arrangement of parts, hereinafter fully described, claimed and illustrated in the accompanying drawings forming part of this application, and in which similar characters of reference indicate corresponding parts in all views, and in which:

Figure 2 is a view similar to Figure 1, but showing a gear-driven power unit.

Figure 3 is a view similar to Figures 1 and 2, but showing an electric motor as a driving means.

Figure 4 is a cross section taken on the line 4—4 of Figure 3, showing the means of mounting the motor.

Figure 5 is a rear end view of a ship's hull, showing the placement of the twin-drive propulsion units.

Figure 1:
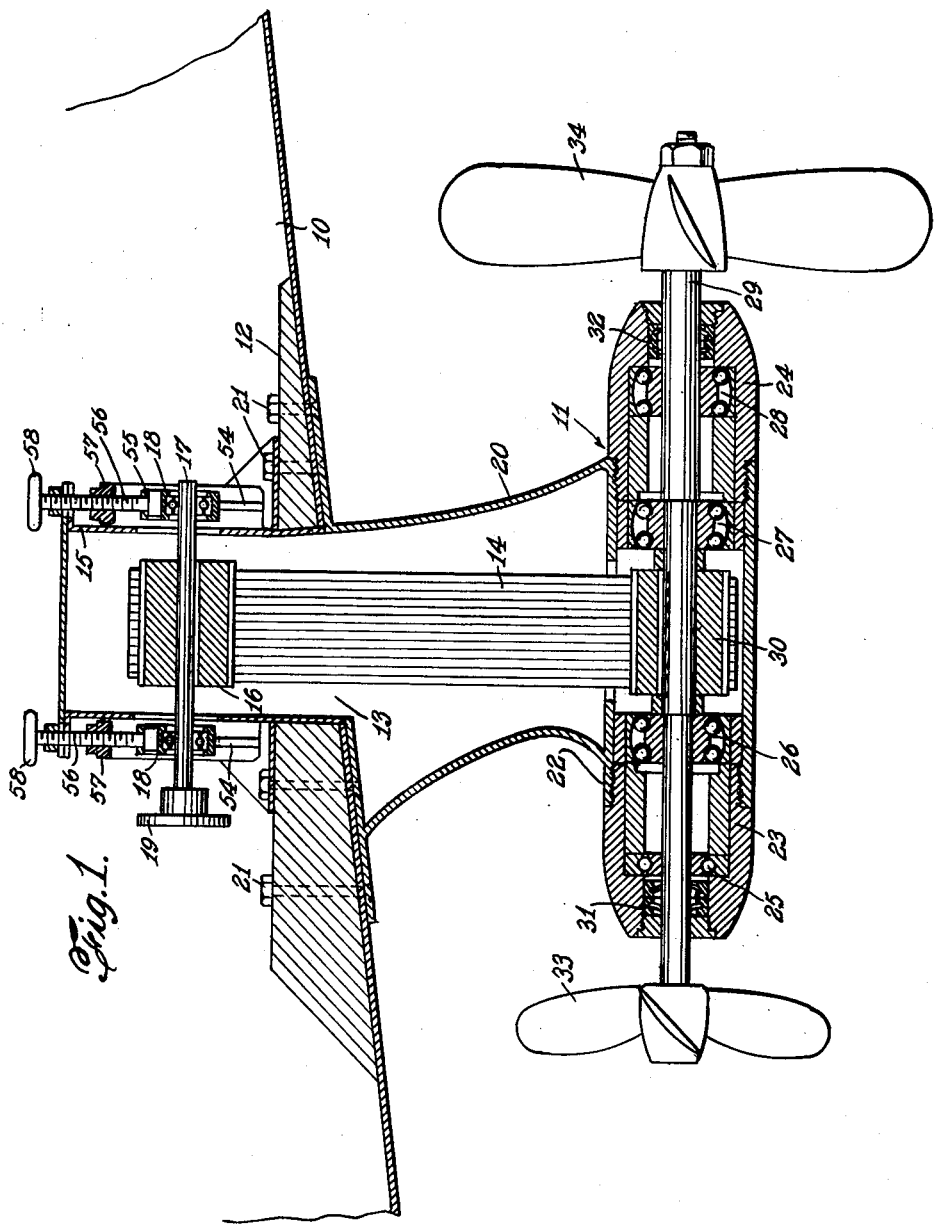
Figure 1 is a central longitudinal section of a portion of a ship's hull, showing a belt-driven propulsion unit suspended therefrom.

Referring more particularly to the drawings, the numeral 10 indicates the hull of a ship from which a belt-driven unit 11 is suspended; a block member 12 is mounted inside the hull 10, which latter is formed with an opening 13 to permit the passage of the belt 14; a casing 15 is supported by the block member 12; a pulley 16 is mounted on a shaft 17, which latter is journaled in a ball bearing 18 in said casing 15. The shaft carries at one end a coupling 19 for connection to the ship's power unit (not shown).

A strut 20 is secured to the hull of the ship by means of bolts 21.

A casing 22 is formed integral with the lower end of the strut 20, for instance, by welding.

The casing 22, which is open at both ends, has bearing members 23 and 24 removably mounted therein; said bearing members are screwed into each end of said casing.

The said bearing members carry suitable ball and trust bearings 25, 26, 27 and 28, which support the shaft 29 carrying at or near its center a pulley 30 driven from the belt 14 and pulley 16;

oil seals 31 and 32 are provided at each end of the bearing members 23 and 24; the shaft 29 is provided at its forward end with a propeller 33, and at its rear end with a propeller 34.

The above described assembly constitutes one complete propulsion unit.

Figure 2 shows a modified form of a propulsion drive in which a gear train is used; the latter comprises a worm 35 mounted on the shaft 17; said worm gear meshes with a spur gear 35' mounted on a shaft 36; the spur gear, in turn, meshes with the gear 37 mounted on a shaft 38, while the gear 37 further meshes with the gear 39 mounted on a shaft 40; also mounted on the shaft 40 is a gear 41 meshing with a worm 42 carried by the shaft 29.

Figure 3 shows a still further modification of my invention in which an electric motor 43 is used for direct drive, eliminating the necessity of the usual belt or gear drive.

The motor 43 is mounted in the casing 44 provided with keys 45, 45 and 46; the said casing is integrally secured to and depending from the strut 20 attached to the hull of the ship in any convenient manner.

The motor casing is provided with key ways 47, 47 and 48.

The relative connection of the keys and key ways serve to obtain an easy and rapid assembly and replacement of the motor, which may be slit into the casing 44, while the key ways will prevent the rotating of said motor within the casing 44.

It may be noted that the key 46 and key way 48 are of a wider dimension than the other keys and key ways; this provides an indexing means for the placement of the motor 43 within the casing 44.

Mounted on the motor casing 43 is a contact block 49 to which the field wires of the motor are connected.

A cable 50 is arranged within the strut 20 and is permanently connected to a block 51 arranged in the casing 44, so that when the motor is properly placed in the said casing connection between the contact block 49 and contact block 51 will be established.

At 52 is shown an inlet to the casing 44, and at 53 is shown an outlet connection from said casing in order to obtain circulation of air to cool the motor.

In order to take up the tension of the chain in case of replacement of the latter, and also adjustment of the chain in order to take up slacks due to wear and tear, the shaft 17 in Figures 1 and 2 is provided with guides 54 attached to the ends of the casing 15 by bolting, and a bearing block 55 in which screws 56 are arranged for vertical movement; said guides are formed with threaded ends 57, which act as nuts in which the screws 56 are rotatable by means of the hand wheel 58, whereby any slacks occurring in the belt 55 may be compensated for.

It is obvious that in Figure 2, the wear and tear on the worm gear 35 may be taken care of in like manner.

It is obvious that changes may be made in the form, construction and arrangement of the several parts, as shown, within the scope of the appended claim, without departing from the spirit of the invention, and I do not, therefore, wish to limit myself to the exact construction and arrangement shown and described herein.

What I claim as new, and desire to secure by Letters Patent of the United States, is:

A multiple propeller drive for ships comprising in combination, a ships' hull having an opening therein, a block member mounted inside said hull, a casing supported by said block member, a shaft journalled in said casing, a pulley mounted on said shaft, and a coupling at one end of the latter adapted to connect said shaft to a power unit, a strut secured to the hull, a second casing integral with the lower end of said strut, a second shaft having a propeller at each end thereof, and being mounted in said second casing, a second pulley arranged on the second shaft, and a belt mounted on said first and second pulley and adapted to actuate said second shaft, guides for said first shaft and being attached to the end of the first casing; bearing blocks supporting said first shaft, and screws mounted in the latter for vertical movement, and handwheels threaded upon said screws, whereby to adjust the belt drive.

References Cited in the file of this patent

UNITED STATES PATENTS

| Number | Name | Date |
|---|---|---|
| 1,294,082 | Golden | Feb. 11, 1919 |
| 1,689,962 | Peck | Oct. 30, 1928 |
| 1,703,722 | Carozzi | Feb. 26, 1929 |
| 1,764,383 | Buchet | June 17, 1930 |
| 1,845,712 | Jacques | Feb. 16, 1932 |
| 1,910,561 | Pierce | May 23, 1933 |
| 2,475,115 | Van Eaton | July 5, 1949 |
| 2,486,574 | Roof | Nov. 1, 1949 |

FOREIGN PATENTS

| Number | Country | Date |
|---|---|---|
| 112,261 | Germany | Aug. 23, 1900 |
| 590,141 | France | Mar. 11, 1925 |